United States Patent [19]

Hoda et al.

[11] Patent Number: 4,831,610
[45] Date of Patent: May 16, 1989

[54] METHOD AND APPARATUS FOR INTERACTIVE CONTROL OF A DATA RECORDING MEDIUM PLAYBACK APPARATUS USING BAR CODE ACCESS

[75] Inventors: Hisashi Hoda; Satomi Sudo, both of Tokyo; Toshiyuki Amaya, Tokorozawa; Kuniaki Siratori, Tokorozawa; Takao Yamada, Tokorozawa, all of Japan

[73] Assignee: Pioneer Electronic Corporation, Tokyo, Japan

[21] Appl. No.: 21,120

[22] Filed: Mar. 3, 1987

[30] Foreign Application Priority Data

Mar. 4, 1986 [JP] Japan .................................. 61-048132
Feb. 9, 1987 [JP] Japan .................................. 62-027574
Feb. 9, 1987 [JP] Japan .................................. 62-027577

[51] Int. Cl.$^4$ ............................................. G11B 27/10
[52] U.S. Cl. ......................................... 369/48; 369/49; 358/342; 235/462; 235/472
[58] Field of Search ...................... 358/335, 342; 360/2, 360/101.1; 369/20, 30, 31, 48, 49; 235/383, 437, 462, 466, 436, 463, 454, 472

[56] References Cited

U.S. PATENT DOCUMENTS

| | | | |
|---|---|---|---|
| 3,752,958 | 8/1973 | Gilberg et al. | 235/436 X |
| 3,811,033 | 5/1974 | Herrin et al. | 235/466 X |
| 3,912,909 | 10/1975 | Harrison | 235/466 X |
| 4,307,293 | 12/1981 | Lazzarotti et al. | 235/462 |
| 4,429,335 | 1/1984 | Sugiyama et al. | 360/10.1 X |
| 4,481,412 | 11/1984 | Fields | 235/383 X |
| 4,519,054 | 5/1985 | Jewer | 369/30 |
| 4,621,259 | 11/1986 | Schepers et al. | 235/462 X |
| 4,652,733 | 3/1987 | Eng et al. | 235/462 |

*Primary Examiner*—Alan Faber
*Assistant Examiner*—W. R. Young
*Attorney, Agent, or Firm*—Foley & Lardner, Schwartz, Jeffery, Schwaab, Mack, Blumenthal & Evans

[57] ABSTRACT

A method and apparatus for controlling a visual data playback apparatus such as a video disc player whereby control is executed in response to input commands which are generated by scanning a printed code, e.g. bar code, on a document to produce code signals which are supplied to the control apparatus of the invention. Portions of the code are positioned close to respective sections of a printed document, so that a user can cause moving or still images relating to a document section to be produced on a monitor display, without the need for the user's eyes to move away from the document being read, e.g. to operate a separate control unit.

6 Claims, 9 Drawing Sheets

METHOD AND APPARATUS FOR INTERACTIVE CONTROL OF A DATA RECORDING MEDIUM PLAYBACK APPARATUS USING BAR CODE ACCESS

BACKGROUND OF THE INVENTION

1. Field of the Invention

The present invention relates to a method and apparatus for controlling a data recording medium playback apparatus such as a video disc player or a video tape recorder (VTR).

2. Background Information

Legible printed media such as dictionaries, catalogs, guidebooks, etc., generally contain a number of photographs and other pictures and diagrams relating to descriptions, guidance material etc. which appear in the printed text. However due to space limitations, the number of such pictorial illustrations which can be provided is limited in extent. In recent years it has become possible to utilize a data recording medium playback apparatus such as a video disc player or a VTR capable of playback of various types of recorded image data, to record substantial amounts of image data including still pictures, moving pictures, or combinations of these, which are linked to respective sections of a document, e.g. to respective descriptive sections or guidance sections of the document. This enables for example image data corresponding to respective sections of a document such as a guidebook to be read out from a video disc and displayed on a monitor screen, while the reader is looking at a corresponding portion of the printed text of the document. Systems of this type have been developed, and enable large amounts of image data to be provided for various sections of such a book or document.

With prior art systems of this type, to enable readout from a video disc of image data which corresponds to a specific section of a document (e.g. an item in a guidebook), address data such as frame addresses are printed in the respective sections of the text. A search system is utilized to find appropriate id on the video disc. To perform readout of the image data relating to a specific section of the document, the operator (i.e. the person reading the document) inputs the corresponding address data to the search system, utilizing an operating unit such as a remote-control unit, and the required image data is then searched for, and is read out and displayed.

However with such a search system, it is necessary for the user to first confirm the frame number of the document section concerned, and to then use the operating unit to input the frame number to the search system. To do this it is of course necessary for the user to move his eyes from the document to the operating unit. As a result, the process of reading the document is temporarily interrupted, so that there is a deterioration of a correlated image formed in the user's mind on the basis of an image conveyed by the printed text and a pictorial image presented by the monitor display.

SUMMARY OF THE INVENTION

It is a first objective of the present invention to provide a video disc search system whereby the aforementioned problem is overcome, so that there is no deterioration of a correlated image formed in the user's mind on the basis of an image conveyed by a printed text and a pictorial image presented by a monitor display.

It is a second objective of the present invention to provide a method of controlling a data recording medium playback apparatus whereby control commands for the apparatus can be expressed by a small number of code digits.

It is a third objective of the present invention to provide a method of controlling a data recording medium playback apparatus whereby the work of planning printed codes to by utilized for respectively different readers, and the cost of printing such codes, is substantially reduced.

It is a fourth objective of the present invention to provide a control apparatus for controlling a data recording medium playback apparatus provided with a printed code scanner, such as to judge a code signal produced by scanning a printed code through the use of the scanner and to execute control of the data recording medium playback apparatus in accordance with the results of this judgment, whereby the frequency of executing such scanning operations can be lowered.

It is a first feature of the present invention that by performing read-in of a bar code which is printed close to an item published on a legible recording medium, recognition is performed of an operating command which is indicated by the printed bar code, whereby a data recording medium playback apparatus is controlled such as to execute playback of video or audio data relating to that item.

It is a second feature of the present invention that during the process of recognition of the contents of a code signal which is read in by scanning a printed code, the total number of digits of the code signal is detected, irrespective of the data contents of these code digits, and that discrimination of control commands is executed in accordance with both that total number of digits and the data which is represented by these digits.

It is a third feature of the present invention that when a code signal is read in by scanning a printed code, during recognition of the contents of the code signal, judgment of operating commands which determine the playback signal processing status of a video disc player is performed based upon the contents of at least a part of the least significant digits of the code signal.

It is a fourth feature of the present invention that a judgment which is performed of the command contents of predetermined digits within a printed code is altered in accordance with the contents of other predetermined digits of the printed code.

A printed code scanner according to the present invention preferably incorporates a repeat switch, and a circuit which generates a repeat command in response to actuation of the repeat switch. The system is configured such that when this command is input to a control circuit, a command expressed by data which was input previously, by scanning a printed code, is again applied to control a recorded data playback apparatus, e.g. disc player, without the necessity for again scanning the same printed code.

To attain the objectives set out hereinabove, a method according to the present invention of controlling a data recording medium playback apparatus essentially comprises the following sequence of steps:

a read-in step of reading a printed code to produce a corresponding code signal;

a decision step of judging the code signal to derive an operating command which is expressed by the printed code, and;

a control step of supplying an operating command to the data recording medium playback apparatus in accordance with the operating command An apparatus for controlling a data recording medium playback apparatus in accordance with the method of the present invention essentially comprises:

a printed code scanner for converting optical changes produced during scanning of a printed code into an electrical code signal decision means for judging operating commands which are expressed by the code signal, and;

control means for issuing operating commands for controlling the data recording medium playback apparatus in accordance with operating commands obtained as a result of the judgment by the decision means.

The printed code scanner preferably includes a manually operated repeat switch, with the decision means being responsive to actuation of the repeat switch for maintaining stored command data expressed by the contents of an electrical code signal which was derived from the printed code scanner during a preceding scanning operation, whereby a control command represented by the stored data is repeated when the repeat switch is actuated.

BRIEF DESCRIPTION OF THE DRAWINGS

FIGS. 3, 4(A,B), 5 and 6 are timing charts for assistance in describing the operation of an embodiment of the present invention;

DETAILED DESCRIPTION OF EMBODIMENTS

Figure 1:
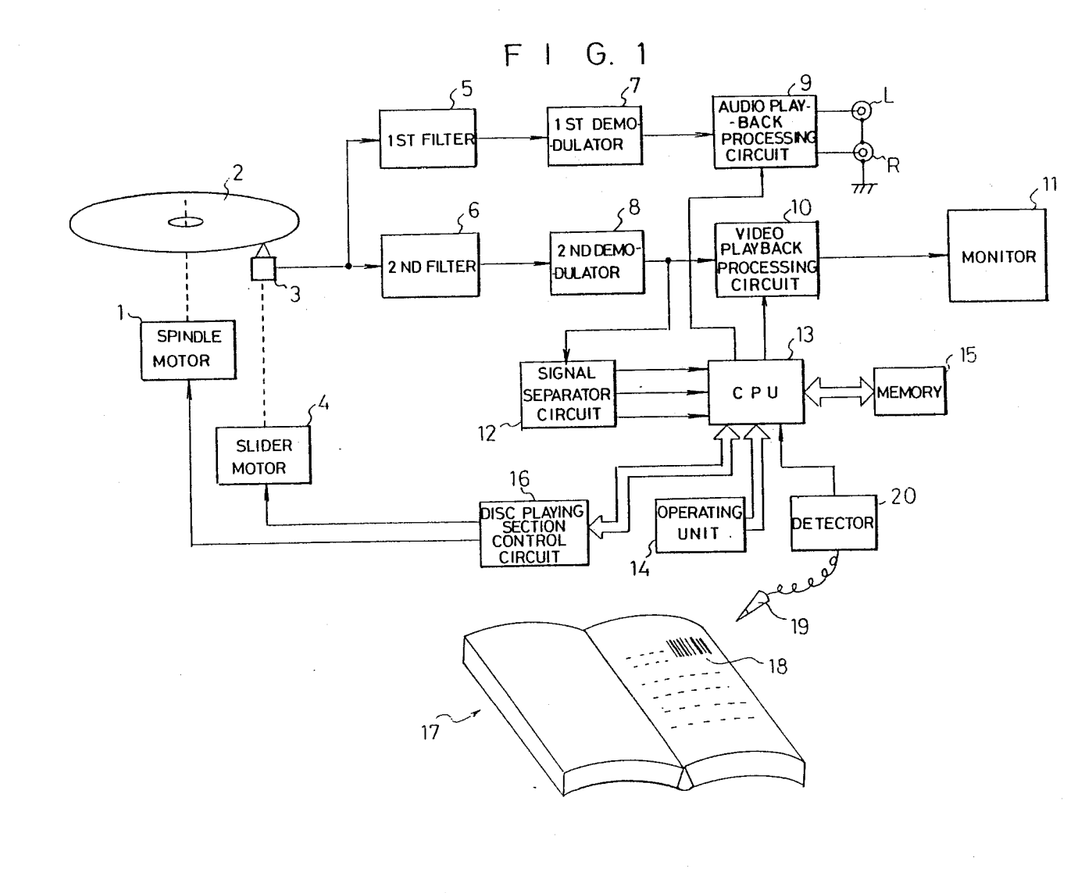
FIG. 1 is a general block diagram of a video disc player and an embodiment of a control apparatus for applying the method of the present invention to control the disc player.

An embodiment of the present invention will be described with reference to the drawings. FIG. 1 shows a data recording medium playback apparatus and a control apparatus for applying the method of the present invention to control the data recording medium playback apparatus. In FIG. 1 the disc playing section of a video disc player is used as an example of a data recording medium playback apparatus, and consists of a turntable (not shown in the drawing), rotated by a spindle motor 1 for rotating a video disc 2. The video disc 2 can be of CAV type or CLV type. It should be noted that the invention is not limited to the use of a video disc, but that other types of data recording disc such as a compact disc can also be utilized.

A pickup 3 is carried on a slider (not shown in the drawing) which is moved radially over the video disc 2 by a slider motor. The radial position on video disc 2 of data read-out point of pickup 3 (i.e. the read-out light spot, in the case of an optical type of pickup) can thereby be freely determined. The disc playing section also includes servo systems such as a spindle servo system, a tangential servo system, tracking servo system, etc. However these are well known in the art, and are omitted from the drawings.

An RF signal produced from pickup 3 is passed through a first filter 5, which transfers only the audio channel component of the RF signal, and also through a second filter 6 which transfers only the video channel component, to thereby derive the audio channel component and video channel component. These are respectively demodulated by first and second demodulators 7 and 8, to produce an audio signal and a composite video signal, respectively. The audio signal is applied to an audio playback signal processing circuit 9, which separates the left and right stereo channels of that signal, and supplies these to output terminals L and R. The video signal from demodulator 8 is input to a video playback signal processing circuit 10, to produce a video signal which is supplied to a video monitor 11.

Control signals such as the vertical (V) and horizontal (H) sync components in the composite video signal are separated from that signal by a signal separator circuit 12, and are supplied to a CPU (central processing unit) 13 which constitutes the control means of this embodiment. The CPU 13 also receives as inputs various commands which are supplied from an operating unit 14, such as a keyboard, and executes processing in accordance with data and programs which are stored in a memory 15. The memory 15 is made up of ROM or RAM devices. As a result of this processing, the CPU 13 supplies control commands to the video playback processing circuit 10, the audio playback processing circuit 9 and a disc playing section control circuit 16. Numeral 17 denotes a document having bar code 18 printed thereon, which is read into the CPU 13 by means of a scanner 19 which produces a code signal that is sensed by a detector 20. The detector 20 may include a memory and decoders for performing serial-to-parallel conversion of data, etc.

The CPU 13 decodes the code signals which are produced from scanner 19, and supplies respective commands to the disc playing section control circuit 16, such as "play", "pause", "step forward", and "search" commands, etc, in accordance with the results of this decoding, as well as command to the audio playback processing circuit 9 for selectively designating monaural or stereo operation, or to designate that a current audio operating mode is to be continued unchanged, and commands to the video playback processing circuit 10, including video ON/OFF commands, and commands to designate that the current video operating status is to be continued unchanged.

Many types of image data are recorded on video disc 2, such as moving picture data. Program data is recorded prior to each item of image data on the disc, in order to facilitate searching for required image data. If the image data recorded on video disc 2 is used as an image file for document 17, which could consist for example of a guidebook which describes various animals, then the image data recorded on video disc 2 could consist of moving picture data items relating to respective different sections of the text of guidebook 17, i.e. to descriptions given in each of respective items in that text. A "start" frame number and an "end" frame number are respectively recorded on the disc at the start and end of each of such moving picture data items, serving as address data to indicate the position at which that data item is recorded on the disc. This address data forms part of a predetermined control code. A discrimination code is also contained in the control code, and is used to distinguish between program data and image data.

Figure 2:
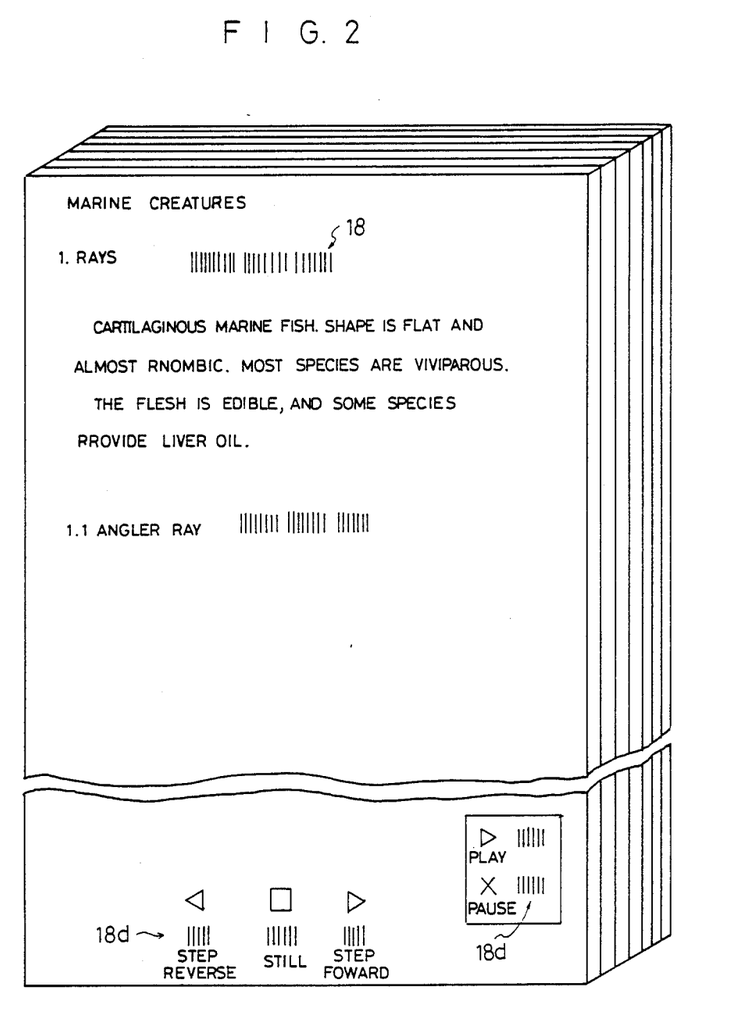
FIG. 2 shows an example of a page in a document having printed code for use with a control method and apparatus according to the present invention.

FIG. 2 shows an example of a page in guidebook 17. Numeral 18 denotes code data printed on that page, which in this example is in the form of bar code data, (referred to in the following simply as bar code), which contains codes respectively expressing a "start" frame number, an "end" frame number, etc, of image data recorded on video disc 2 corresponding to an item of text printed on guidebook 17. In this example, the bar code 18 consists of a "start" frame number code portion 18a, an "end" frame number portion 18b, and a parameter code portion 18c which is used to enable an operating mode to be freely set as required, such as the playback speed of the video disc player. Furthermore in the lower part of the page of guidebook 17, bar code portions indicated by 18d are provided for use in designating respective operating modes of the video disc player, such as "play", "pause", "step reverse", "still", "step forward".

Figure 3:
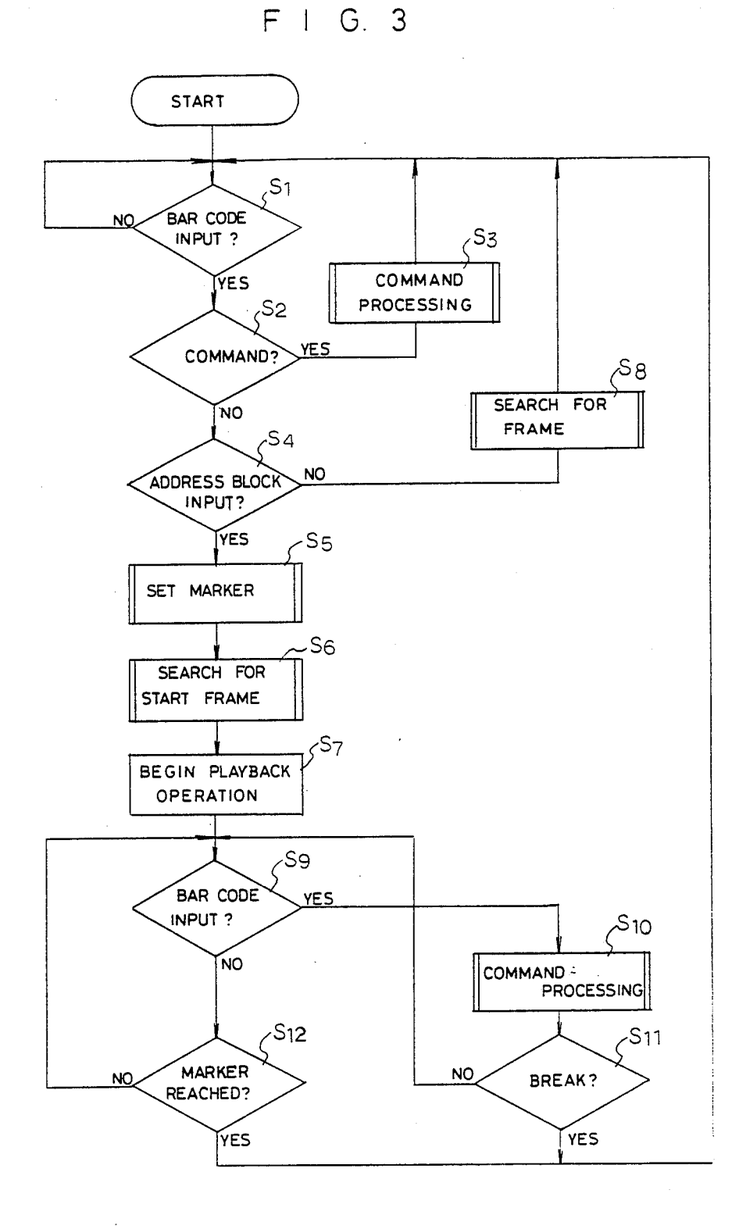

The operating sequence of CPU 13 of this embodiment of a video disc search system according to the present invention will now be described, referring first to the flow chart of FIG. 3. It will be assumed that program data necessary in searching for data recorded on video disc 2 has been stored beforehand in memory 15. In this condition, when a bar code 18 printed on guidebook 17 is read into the CPU 13, i.e. by the reader performing scanning across the bar code by means of scanner 19, then this code input is recognized by the system (step $S_1$) a decision is made as to whether or not the bar code data represents a command which designates an operating mode (step $S_2$) If the bar code data is judged to represent command data, then processing of that command is executed (step $S_3$) Operation then returns to step $S_1$.

If it is judged in step $S_2$ that the bar code which has been input does not express a command, then a decision is made as to whether or not a pair of code portions respectively designating a "start" frame number and an "end" frame number (i.e. an address block) has been input (step $S_4$) If input of an address block has occurred, then a mark is set at the address of the end frame number (step $S_5$), and a search is made for the start of the frame (step $S_6$) Playback operation by the disc playing section is then initiated (step $S_7$).

If it is judged in step $S_4$ that an address block has not been input, but that only a single frame number has been input, then a search is executed for this frame having this number (step $S_8$). Operation then returns to step $S_1$, to wait for the next bar code input.

If a bar code is input which represents an operating command is input during playback operation, i.e. while image display is in progress (step $S_8$), then processing of that command is executed (step $S_{10}$) Thereafter, a decision is made as to whether or not playback of image data which was taking place prior to the operating command input (i.e. prior to detection of that command input in step $S_9$) is to be continued, then operation returns to step $S_9$, otherwise operation returns to step $S_1$ to wait for input of a bar code.

As playback operation continues following step $S_9$, a decision is made as to whether or not the marker which was set in step $S_5$ has been reached (step $S_{12}$) If it is judged that this marker has been reached, indicating that playback of the block of image data designated by the bar code input has been completed, operation returns to step $S_1$.

In this way, with a search system according to the present invention, the user need only trace out a printed bar code 18 positioned adjacent to an item printed in guidebook 17, utilizing scanner 19, whereupon a rapid search is executed for image data corresponding to the contents of that printed item. It is therefore only necessary for the user's eyes to move between the guidebook 17 and the monitor display 11. Thus, there is no deterioration of a correlated image formed in the user's mind on the basis of an image conveyed by the printed text and a pictorial image presented by the monitor display, during the process of searching for requisite image data.

In the embodiment of the present invention described above, the legible data recording medium is a guidebook. However the invention is of course not limited to such a medium, but is also applicable to other types of document, including pamphlets, catalogs, etc., as well as encyclopedias etc. Furthermore the recorded image data is not limited to moving pictures, but can also consist of still pictures or a combination of moving and still pictures.

With a video disc search system according to the present invention as described above, a bar code which is printed adjacent to a section of a legible data recording medium is read into the search system, whereby a search is executed for image data which corresponds to that section. As a result, it is not necessary for the user's eyes to move to an operating unit in order to perform input of address data to the search system, as is required with prior art types of search systems. Thus, as stated above, the user can retain a correlated image based upon the contents of the printed text and the displayed images produced on a monitor, while the user initiates a search for desired image data. In addition, such a search can be rapidly executed.

A bar code configuration which is widely used at present employs the "interleaved 2 of 5" arrangement, consisting of a combination of code units each formed of even-numbered decimal digits which are positioned between a start mark and a stop mark. With the present invention, each of these code units designates a command. The commands include "play", "pause", "step", commands, etc, which designate an operating mode of a data recording medium playback apparatus, as well as commands which designate certain playback conditions, and commands relating to the signal processing method to be employed, such as video playback execution command, audio playback execution command, stereo/mono selection command, etc.

A prior art arrangement of bar code which expresses, for example, commands designating a search for chapter 10, and execution of video playback together with audio stereo playback, might be of the following form:

In the above, the □ symbol indicates a code unit. Each code unit will generally consist of a pair of decimal digits enclosed between a start mark and a stop mark. In this example, 8 code units are required, so that the overall length of the bar code will be rather large, so that a comparatively large amount of space on the printed document will be taken up by the bar code. In addition, it will be necessary to incorporate a large-capacity buffer memory in the search system, to receive bar code input. For these reasons, use of such a prior art arrangement of bar code will be undesirable in some cases.

With the present invention, however, the following relationships are established between the code signals and the commands:

(1) Independent Commands

Independent commands are expressed as 4-digit code signals of the form

| N1 | N2 | N3 | N4 |, each digit being in the range 0 to 9. N1 denotes an I.D. code, which identifies a reader (i.e. an operator). If such an I.D. code is not necessary, then N1 can be set for example to 0. N1 and N3 are a pair of decimal digits which express the contents of the command. N4 is a checksum digit, which is made equal to the least significant digit of the result obtained by decimal addition of digits N1 through N3. Examples of relationship between codes for independent commands and the command contents are as follows:

| N1 | N2 | N3 | N4 | Command Contents |
|----|----|----|----|------------------|
| 0 | 1 | 0 | 1 | Audio Off |
| 0 | 1 | 1 | 2 | Audio 1, or left channel |
| 0 | 1 | 2 | 3 | Audio 2, or right channel |
| 0 | 1 | 3 | 4 | Stereo |
| 0 | 2 | 0 | 2 | Video Off |
| 0 | 2 | 1 | 3 | Video On |
| 0 | 3 | 0 | 3 | Play |
| 0 | 3 | 1 | 4 | Pause |
| 0 | 3 | 2 | 5 | Step (forward) (CAV discs only) |
| 0 | 3 | 3 | 6 | Step (reverse) (CAV discs only) |
| 0 | 4 | 0 | 4 | Reject, or terminate |

(2) Chapter Search Commands

Chapter search commands are expressed as 6-digit code signals of the form

| N1 | N2 | N3 | N4 | N5 | N6 |, each digit being in the range 0 to 9. N1 designates an I.D. code for identifying a category of users. The CPU 13 executes compensation or modification of the contents of the command expressed by the code digits, in accordance with the contents of the I.D. digit. If the I.D. code is not necessary, then N1 can be set for example to 0. N1 and N3 are a pair of decimal digits which express the address of a chapter which is to be searched for. N4 and N5 constitute a code which expresses an ancillary command. An ancillary command designates an operating status of the signal system of the disc playing section, but does not determine the operating mode of the disc playing section. For example, the following correspondence might be established between the various numeric values of N4 and N5 and respective ancillary commands:

| ANCILLARY COMMAND CODE TABLE ||||
|----|------------------|----|------------------|
| N4 | Ancillary command | N5 | Ancillary command |
| 0 | Video Off | 0 | Audio Off |
| 1 | Video On | 1 | Analog audio 1/L |
| 2 | No effect | 2 | Analog audio 2/R |
| 3 | No effect | 3 | Analog audio stereo |
| 4 | No effect | 4 | No effect |
| 5 | No effect | 5 | Digital audio 1/L |
| 6 | No effect | 6 | Digital audio 2/R |
| 7 | No effect | 7 | Digital audio stereo |
| 8 | No effect | 8 | No effect |
| 9 | Continue preceding status | 9 | Continue preceding status |

N6 is a check sum digit, which is made equal to the least significant digit of the result obtained by decimal addition of digits N1 through N5.

(3) Chapter Playback Commands

Chapter playback commands are expressed by 8-digit code signals of the form

| N1 | N2 | N3 | N4 | N5 | N6 | N7 | N8 |, each digit being in the range 0 to 9. The N1 digit has the same significance as described in sections (1) and (2) above. N2 and N3 are a pair of decimal digits which indicate the address of the leading chapter of the section which is to be searched for and playback then executed. N4 and N5 are a pair of decimal digits which express the address of the final chapter of this section which is to be searched for. N6 and N7 express ancillary commands, in the same manner as described in section (2) above. N8 is a check sum digit, which is made equal to the least significant digit of the result obtained by decimal addition of digits N1 through N7. Thus for example if playback of chapter 3 is to be executed, with stereo audio output, and playback is to be halted at the start of chapter 4, then the chapter playback command would have the form 00304939. The contents of the I.D. digit express the relationship between an amendment or alteration parameter and the contents of the command digits. For example if the intended users of the apparatus are classified into 3 categories, i.e. low level, medium level and high level users, then the contents of the digits expressing the chapter playback command will have differing significances, depending upon respective different values of the I.D. digit. As an example if the I.D. code indicates that the user is at a beginner level, then the command code which determines the chapter playback limits might specify playback from chapter 2 to chapter 4, whereas if the I.D. digit specifies a high level user, then even if the same command code is input as in the case of the beginner user, it can be arranged that the CPU 13 will judge that chapter playback is to be executed over a different range, e.g. from chapter 1 to chapter 5.

(4) Frame Search Commands

Frame search commands are expressed as 10-digit code signals of the form

| N1 | N2 | N3 | N4 | N5 | N6 | N7 | N8 | N9 | N10 |, each digit being in the range 0 to 9. N1 and N2 are I.D. code digits. If an I.D. code is not necessary, then these digits can be fixed for example at 0. N3, N4, N5, N6 and N7 are 5 decimal digits which express the address of a frame which is to be searched for. N8 and N9 constitute an ancillary command code, as described hereinabove. N10 is a check sum digit, which is made equal to the least significant digit of the result obtained by decimal addition of digits N1 through N9.

If for example the frame whose address is 23100 is to be searched for, and direct video playback of that frame then executed, with audio stereo playback, the frame address command would be 0023100938.

(5) Segment Playback Commands

Segment playback commands are expressed as 14-digit code signals of the form

| N1 | N2 | N3 | N4 | N5 | N6 | N7 | N8 | N9 | N10 | N11 | N12 | N13 | N14 | each digit being in the range 0 to 9. N1 is an I.D. digit, which can be fixed at a value of 0 if not required. N2, N3, N4, N5 and N6 are a set of five decimal digits which express the address of the leading frame of a segment which is to be searched for and playback then executed. N7, N8, N9, N10 and N11 are a set of five decimal digits which express the address of the final frame of this segment which is to be searched for. N12 and N13 are digits of an ancillary command code. N14 is a check sum digit, which is made equal to the least significant digit of the result obtained by decimal addition of digits N1 through N13. If for example the frame address 23100 is to be searched for and playback then executed from that frame until frame address 23500, with direct video playback and with 2/R audio playback, then the segment playback command for this would be 02310023500927.

Figures 4, 4A:
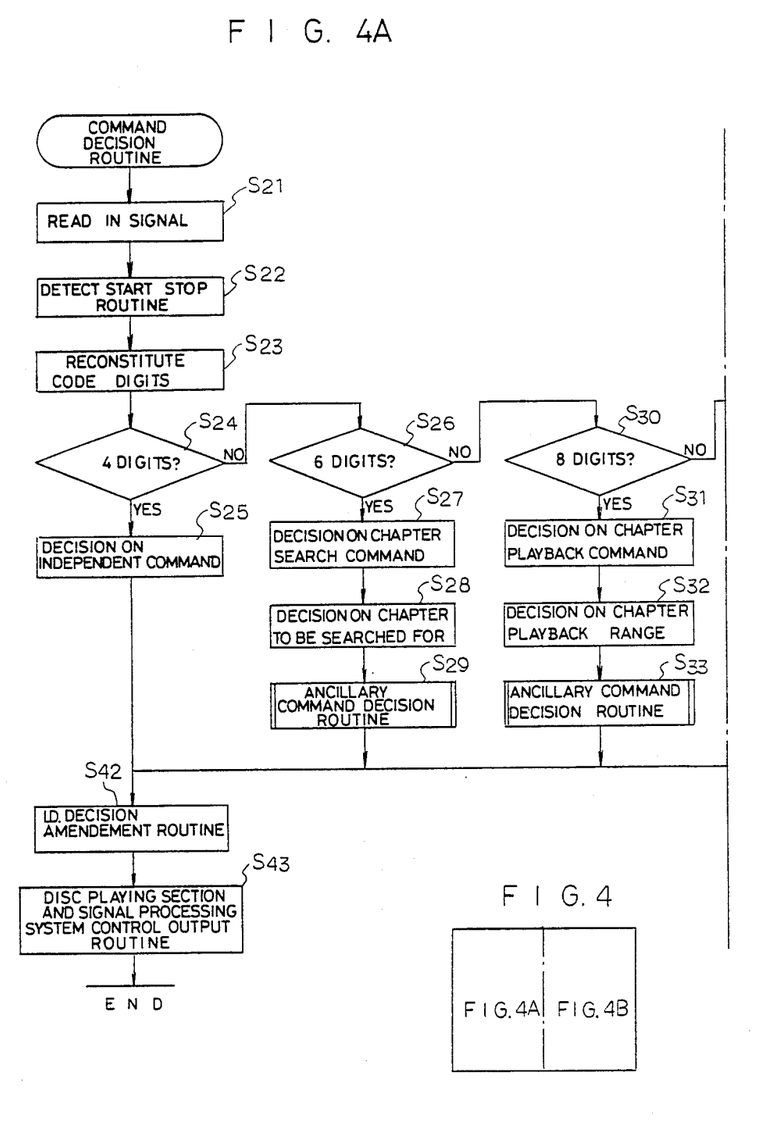
Figure 4B:
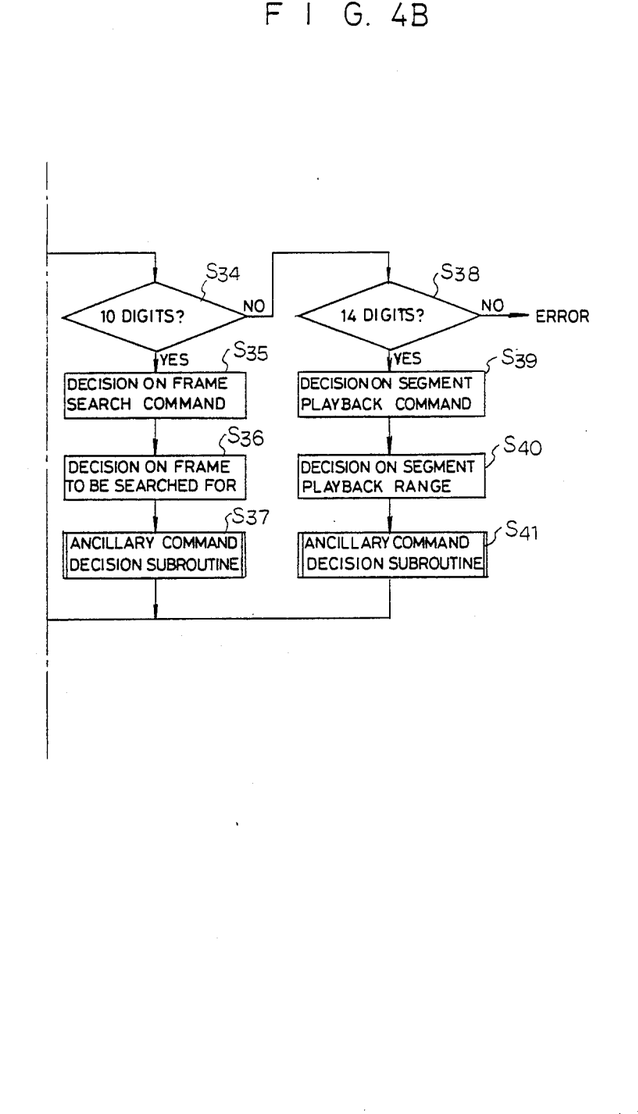

The programs under which CPU 13 operates to control a data recording medium playback apparatus and playback signal processing system in accordance with read-in of printed codes of the form described above will be explained in the following. FIG. 4 shows a command decision routine which is executed by CPU 13 at appropriate interrupt timings. In this routine, a code signal is first read in from detector 20 (step $S_{21}$), then the start and stop portions of this signal are detected, and discrimination of the code signal is performed (step $S_{22}$) The code digits are then reconstituted (step $S_{23}$). As described in the above, a code signal consists of a plurality of digits each having a value within the range 0 to 9. A decision is first made as to the total number of digits in the code signal, including the I.D. digit and the check sum digit. If the code signal consists of 4 digits, then a decision is made that the signal represents an independent command, and the system then judges the contents of the command, in accordance with a predetermined relationship (such as that shown in the independent command code table given hereinabove). (steps $S_{24}$, $S_{25}$). It should be noted that it is equally possible to employ a method whereby a decision as to the type of command signal is reached by first removing the I.D. digit and the check sum digit. In this case, a decision as to whether or not the code signal represents an independent command would be made in accordance with whether or not the code signal consists of two digits.

If it is found in step $S_{24}$ that the number of digits in the code signal is not equal to 4, then a decision is made as to whether or not the code signal is made up of 6 digits (step $S_{26}$). If there are 6 digits, then the code signal is judged to represent a chapter search command. The system then judges the number of the chapter which is to be searched for (step $S_{28}$). An ancillary command decision routine (described hereinafter) is then executed, to judge the contents of an ancillary command (step $S_{29}$).

If the total number of digits in the code signal is neither 4 nor 6, then a decision is made as to whether or not the code signal consists of 8 digits (step $S_{30}$). If there are 8 digits, then this is judged to indicate a chapter playback command (step $S_{31}$), and a decision on the chapter playback range is then made (step $S_{32}$). The ancillary command decision routine (described hereinafter) is then executed (step $S_{33}$).

If the total number of digits of the code signal is neither 4 nor 6 nor 8, then a decision is made as to whether or not there are 10 digits (step $S_{34}$). If the code signal consists of 10 digits, then it is judged that the signal represents a frame search command (step $S_{35}$). A decision is then made on the number of the frame which is to be searched for (step $S_{36}$), then the ancillary command decision routine is executed (step $S_{37}$).

If the code signal is found to consist of neither 4, 6, 8, nor 10 digits, then a decision is made as to whether or not the signal contains 14 digits (step $S_{38}$). If there are 14 digits, then the code signal is judged to represent a segment playback command (step $S_{39}$). The leading frame number and the final frame number of the segment which is to be played are then judged (step $S_{40}$). The ancillary command decision routine is then executed (step $S_{41}$).

If the code signal is found to consist of neither 4, 6, 8, 10 nor 14 digits, then it is judged that the code contains an error.

The number of digits upon which code signal decisions are made can of course be altered, depending upon the specific code signal configuration which is utilized. With a code signal which utilizes the interleaved 2 of 5 arrangement, even-numbered digits are used in the code signal. However it would be equally possible to employ a different code arrangement, in which odd-numbered digits are used. However if the interleaved 2 of 5 code arrangement is used, with even-numbered digits, then it is convenient to make the leading digit of the code signal the I.D. digit, and to make the final digit the check sum digit.

After any of steps $S_{25}$, $S_{29}$, $S_{33}$, $S_{37}$ or $S_{41}$ described above, step $S_{42}$ is executed, in which the I.D. digit decision auxiliary routine is executed, whereby the command contents represented by the input code digits can be altered in accordance with the value of the I.D. digit (step $S_{42}$).

The I.D. digit decision amendment routine is described hereinafter. If the I.D. digit is not to be utilized, then that routine can be omitted.

Upon completion of the command decision process described above, the CPU 13 supplies operating commands such as "play", "pause", "search", "still" commands etc., to the disc playing section control circuit 16 in accordance with the input code signals, while monitoring the lock-in status of the servo systems of the disc playing section in conjunction with disc playing section control circuit 16. In addition, CPU 13 supplies control commands to the signal systems of audio playback processing circuit 9 and video playback processing circuit 10, to determine the playback operating conditions established by these circuits, in accordance with the ancillary commands (step $S_{43}$). Specific examples of systems for controlling such a disc playing section and signal processing circuits are well known in the art, and so no detailed description will be given herein.

Figure 5:
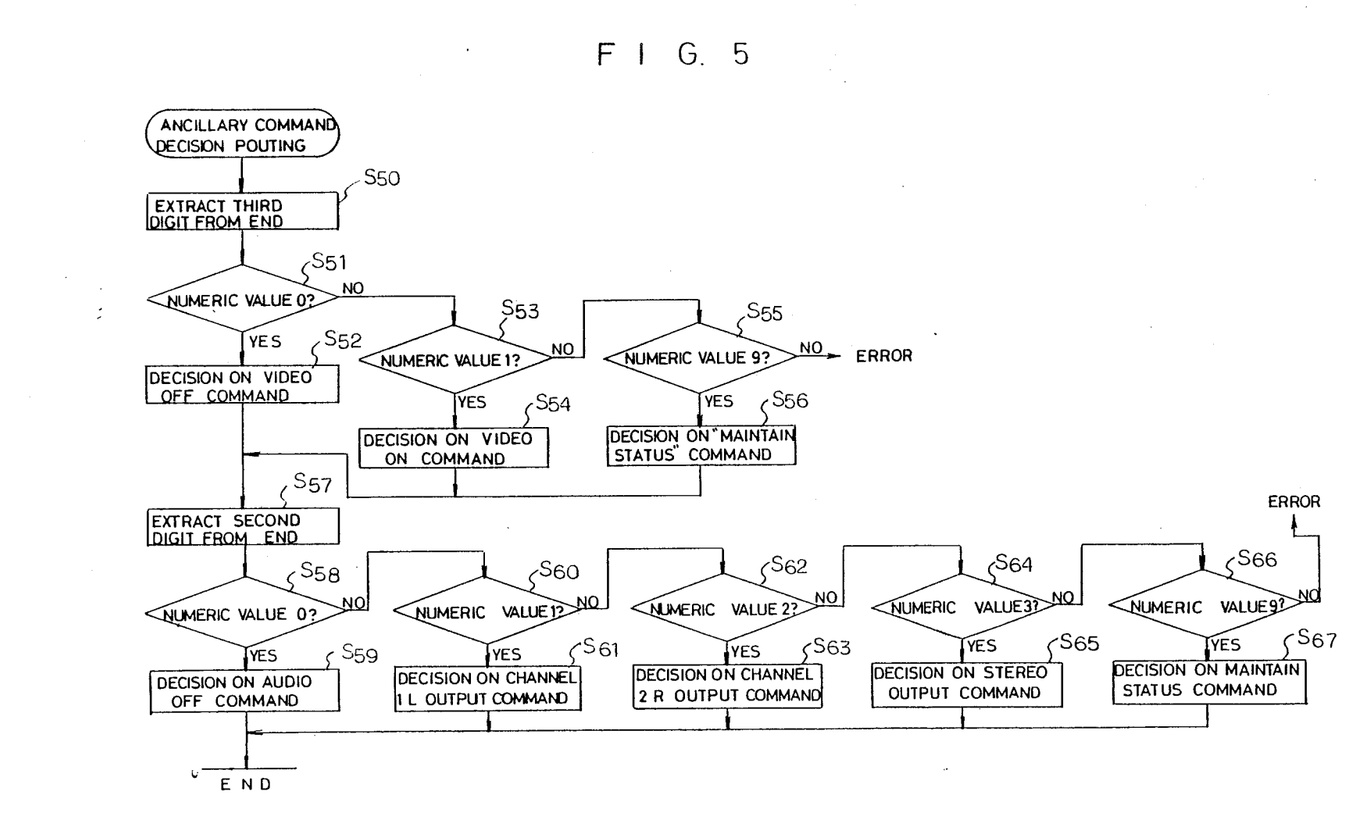

The ancillary command decision routine will be described referring to FIG. 5. The digit of the code signal which is two places higher in significance than the final (least significant) digit of that code signal is first extracted, (step $S_{50}$) and a decision is made as to whether or not the numeric value of this digit is zero (step $S_{51}$). If the digit value is zero, then this is judged to express the video OFF command (step $S_{52}$). If the value is other than zero, then a decision is made as to whether or not the value is 1 (step $S_{53}$). If the value of the digit is 1, then this is judged to express the video ON command (step $S_{54}$). If the value is not 1, then a decision is made as to whether or not the value is 9 (step $S_{55}$). If the value is 9, then the digit is judged to express a "maintain previous status" command. If the value is not 9, then this is judged to indicate an error.

The digit which is one place higher in significance than the final digit of the code signal is extracted (step $S_{57}$), and a decision is made as to whether or not the numeric value of the digit is zero (step $S_{58}$). If the value is zero, then this is judged to express and audio OFF command (step $S_{59}$). If the value is not zero, then a decision is made as to whether or not the value is 1 (step $S_{60}$). If the value is 1, then this is judged to express a channel 1 (L only) output command (step $S_{61}$). If the value is not 1, then a decision is made as to whether or not the value is 2 (step $S_{62}$). If the value is 2, then this is judged to express a channel 2 (R only) output command (step $S_{63}$). If the value is not 2, then a decision is made as to whether or not the value is 3 (step $S_{64}$). If the value is 3, then this is judged to express a stereo output command (step $S_{65}$). If the value is not in the range 0 to 3, then a decision is made as to whether or not the value is 9 (step $S_{66}$). If the value is 9, then this is judged to express a "maintain previous status" command (step $S_{67}$). If the numeric value of the contents of this digit is neither in the range 0 to 3, nor 9, then there is judged to be an error. If commands have been assigned to numeric values in the range 4 to 8, then of course it will also be necessary to execute decisions with respect to these values also.

It is preferable that the digits which express ancillary commands be positioned as the lower-significance digits of the code signal, with judgment of disc playing section control commands being executed first and with the ancillary command routine being executed thereafter, since such an arrangement enhances the time sequence of operations of the overall system.

Figure 6:
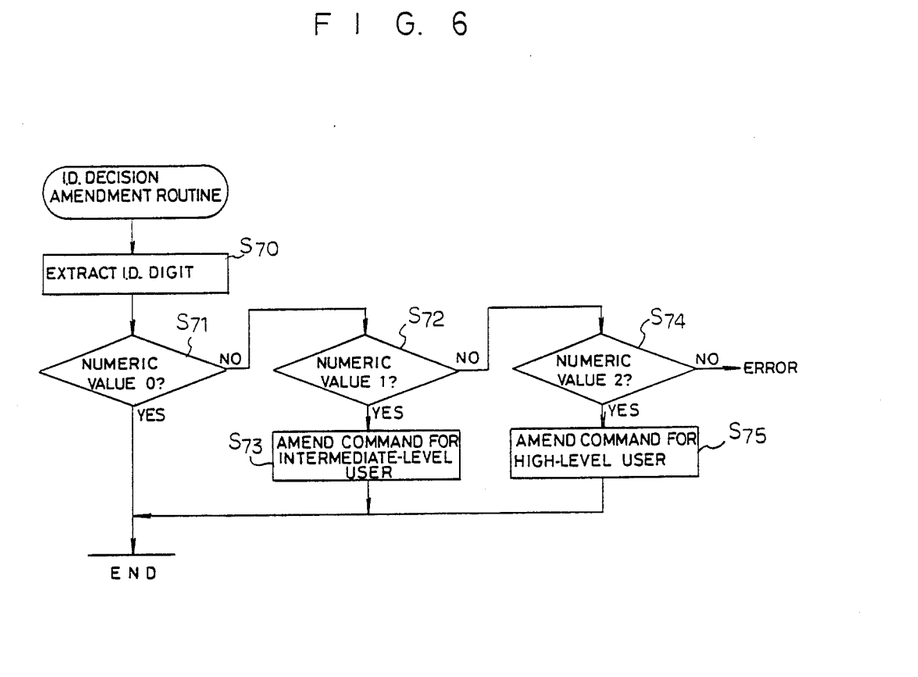

The I.D. decision amendment routine will be described referring to FIG. 6. At the start of this routine, a predetermined I.D. digit (e.g. the leading digit of the code signal) is extracted from the code signal digits (step $S_{70}$). If the numeric value of this digit is zero, then this is judged to indicate that either there is no I.D. designated, or that no command amendment is required (e.g. for the case in which the intended user is a beginner). In such a case, execution of the routine is terminated (step $S_{71}$). If the value of the digit is not zero, than a decision is made as to whether or not the value is 1 (step $S_{72}$). If the value is 1, then this is judged to indicate that the intended user is for example an intermediate-level user, i.e. that the chapter playback range which designated by the code digits is to be amended in accordance with a predetermined formula (step $S_{73}$). Such a predetermined formula can for example be such that, designating the leading chapter of the playback range designated by the code digits as $F_1$ and the final chapter as $F_2$, $F_1$ and $F_2$ are respectively amended in accordance with:

$$F_1 + \Delta F_1 \rightarrow F_1,$$

$$F_2 + \Delta F_2 \rightarrow F_2$$

Various other types of command amendment can also be envisaged, such as other methods of incrementing or decrementing the playback range, or the addition of segment playback commands.

If it is found that the numeric value of the I.D. digit is not 1, then a decision is made as to whether or not the value is 2 (step $S_{74}$). If the value is 2, then this is judged to indicate that the intended operator is a high-level user, and the contents of the operating command are amended in an appropriate manner for such a user. Various types of modification to the command contents can be envisaged, s described hereinabove.

With a playback apparatus control method according to the present invention, as will be clear from the above description, each control command is defined by a printed code which is read into a control system and a decision made upon the code contents. The results of this judgment, representing a control command, are then stored in a memory, and control of the playback apparatus is then executed in accordance with the stored command data. In addition, judgment of a command represented by code is made not only on the basis of the digits of that code which are used to express a command but also upon the total number of digits in the code. This enables the length of the printed code to be made shorter, and furthermore simplifies the process of read-in of a printed code and a reduction of the buffer memory capacity which is required in the device utilized to read in the code.

Furthermore with a display apparatus control method according to the present invention, the contents of a specific predetermined digit of the printed code are used to modify the contents of commands which are derived by judging the contents of other digits of the code. Thus for example, if a printed code is prepared for use by beginning users, then it is only necessary to vary the contents of one digit (referred to herein as the I.D. digit) in order to produce printed codes which will be suitable for use by intermediate-level users and high-level users respectively, i.e. it is not necessary to provide completely different sets of code for these respective categories of user. In this way, the cost of preparing such code and the printing costs involved can be substantially reduced.

With a control method and apparatus as described hereinabove, cases will arise in which data is to be input to the control apparatus which is identical to data which was input immediately previously, for example when the user desires a video image is to be repetitively displayed. This could of course be accomplished by providing a "repeat" command as part of the available commands, to be input by bar code scanning in the same way as for other commands. However it is preferable to simplify as far as possible the input operations which the user must perform in order to execute such a "repeat" command input function. Another embodiment of the invention will be described, referring to FIG. 7, having the objective of providing such a simplified "repeat" command input capability.

Figure 7:
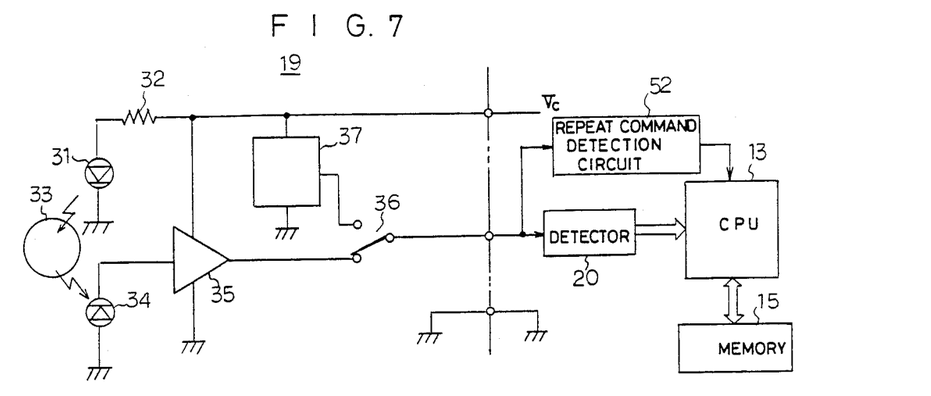
FIG. 7 is a simplified circuit diagram of an embodiment of a control apparatus according to the present invention which includes a repeat switch.

In FIG. 7, reference numeral 32 denotes a current limiting resistor through which drive current is supplied to a light-emitting element 31. A light beam emitted from element 31 passes through a spherical lens 33 to be reflected from a printed bar code (not shown in FIG. 7), and the reflected light falls upon a photo-receptive element 34. An output signal is thereby produced from photo-receptive element 34, which is amplified by a limiting amplifier 35, which is driven into the saturation region of operation. A waveform-shaped bar code signal is thereby output from amplifier 35, and is transferred through one input terminal of a repeat switch 36 to a detector 20 of a disc player control system according to the present invention, and also to a "repeat" command detection circuit 52. The lens 33, elements 31, 34, and amplifier 35, with the addition of repeat switch 37 and oscillator 37 constitute in combination the scanner 19 shown in FIG. 1. A "repeat" signal having a predetermined frequency is supplied form an oscillator 37 to the other input terminal of repeat switch 36. The repeat switch is of nonlocking type, and functions to select the "repeat" signal from oscillator 37 to be supplied to the control system so long as repeat switch 36 is actuated by the user, and to select the bar code at all other times.

Figure 8A:
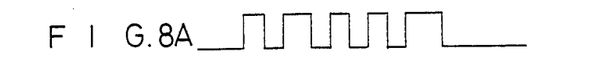
FIGS. 8A and 8B are waveform diagrams for assistance in describing the operation of the embodiment of FIG. 7.
Figure 8B:
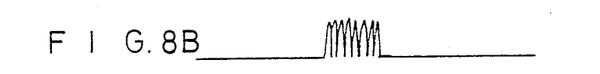

FIGS. 9A and 8B illustrate the waveforms of the bar code signal from amplifier 35 and the "repeat" signal from oscillator 37, respectively.

The bar code signal is reconstituted by the decoder of detector 20 into a code signal having a suitable form for processing by CPU 13. The "repeat" signal is detected by the "repeat" command detection circuit 52, which can consist for example of a filter which will pass only the "repeat" signal frequency and a comparator which produces a "repeat" command output only when the "repeat" signal level from the filter output exceeds a predetermined level. The CPU 13 successively reads in the code signal to be stored in memory 15, and subsequently controls the disc player operation in accordance with the command which is represented by the data thus stored, as described hereinabove. When the "repeat" signal is supplied to CPU 13, the code signal data which has been stored in memory 15 as a result of a previous scan across the printed bar code is read out of memory 15 and used once more to control the operation of the disc player.

Figure 9:
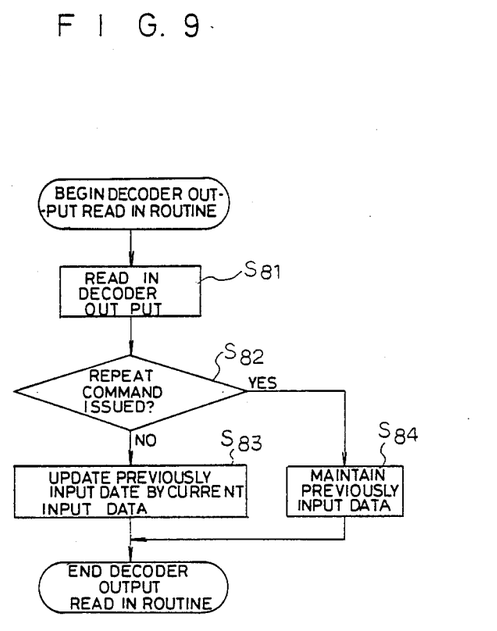
FIG. 9 is a timing chart for assistance in describing the operation of the embodiment of FIG. 7.

The operating sequence of CPU 13 for the embodiment of FIG. 7 will be described with reference to the flow chart of FIG. 9. A main control program is stored beforehand in memory 15, and is executed while power is supplied to the circuits of the control system. During execution of this main control program, operation is transferred to the decoder output read-in subroutine shown in FIG. 9. If a control signal is being output from a decoder in detector 20, then this is sequentially read into memory 15 and temporarily stored therein as command data. Memory 1 thereby has stored therein both the code signal group which was thus stored, and a code signal group which was previously input (step $S_{81}$). If the user is not actuating the repeat switch 36 (judged in step $S_{82}$), and a code signal group has been previously supplied and stored in memory 15, this is updated by the code signal group which is input at this time (step 83). If on the other hand a "repeat" command is being issued (step $S_{82}$), then updating of the previously input code signal group is not performed, and this is left unchanged (step $S_{84}$). Operation then is returned to the main control program, and control of the disc player operation is performed in accordance with the commands expressed by the code signal group which was previously input.

In this way, if the "repeat" command is issued, control of disc player operation is executed on the basis of a code signal group which was previously input and stored, without the necessity for performing further bar code scanning.

It is also possible to distinguish the "repeat" signal on the basis of a difference in pulse width between pulses of the "repeat" signal and the pulses of the bar code signal from the scanner. It would of course be possible to implement the functions of decoder 20 within the CPU 13.

Figure 10:
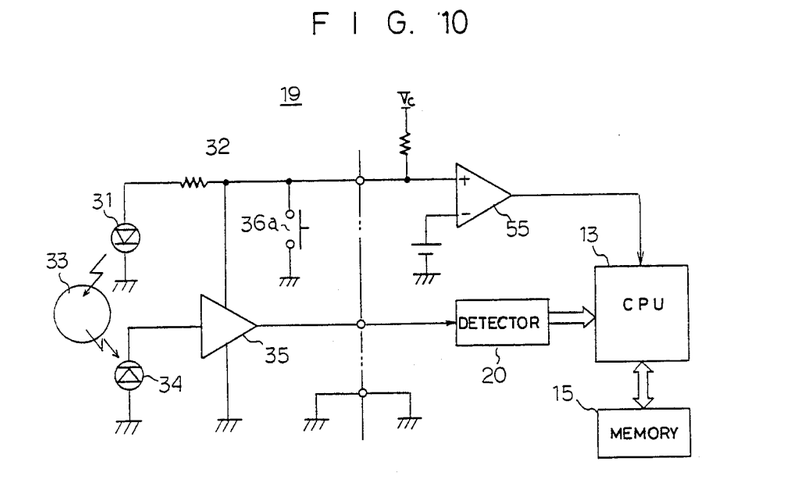
FIG. 10 shows a second embodiment of a control apparatus according to the present invention which includes a repeat switch.

Another embodiment of the present invention is shown in the block circuit diagram of FIG. 10. Components in FIG. 10 identical to components of FIG. 7 are indicated by corresponding reference numerals, and further description will be omitted. In this embodiment, a power supply line of scanner 19 is connected to ground potential when switch 36a is closed, and this condition is detected by a level sensor 55 provided within the disc player control system. Thus the output signal from level sensor 55 constitutes a "repeat" signal, having the function described hereinabove. The operation of this embodiment is otherwise identical to that of the embodiment shown in FIG. 7.

As can be understood from the above, a bar code scanner of an apparatus according to the present invention can be provided with a repeat switch, with actuation of this repeat switch causing a command expressed by previously input code data to be automatically applied once more to control the operation of a disc player. Such a feature substantially simplifies use of the scanner.

What is claimed is:

1. A method of controlling a data recording medium playback apparatus comprising, sequentially:
   a read-in step of reading a printed code comprising a plurality of digits to produce a corresponding code signal;
   a decision step of judging said code signal to derive an operating command which is expressed by said printed code, said decision step comprising steps of detecting a total number of digits in said code signal irrespective of data contents expressed by said digits, and generating said operating command based upon both said data contents and upon said total number of digits; and
   a control step of supplying an operating command to said data recording medium playback apparatus in accordance with said operating command.

2. A control method comprising:
   a read-in procedure comprising reading a printed code comprising a plurality of digits to produce a corresponding code signal;
   a decision procedure of judging the contents of said code signal to generate operating commands, said decision procedure comprising steps of detecting a total number of digits in said code signal irrespective of data contents expressed by said digits, and generating said operating commands based upon the contents of at least one predetermined digit of said code signal and upon the total number of digits in said code signal; and
   a control procedure comprising supplying said operating commands to a recording medium playback section and a playback signal processing system of a data recording medium playback apparatus in accordance with results obtained in said decision procedure.

3. A control method according to claim 2, in which said predetermined digit is a low-significance digit of said code signal.

4. A control method comprising:
   a read-in procedure for reading in a printed code comprising a plurality of digits;
   a decision procedure for judging a code signal obtained in said read-in procedure, said decision procedure comprising steps of detecting a total number of digits in said code signal irrespective of data contents expressed by said digits, and generating operating commands based upon both said data contents and upon said total number of digits; and
   a control procedure for supplying said operating commands to a data recording medium playback apparatus in accordance with results obtained in said decision procedure; and
   an amending procedure for amending said results of a decision made in said decision procedure with respect to contents of digits of said code signal in accordance with the contents of at least one predetermined other digit of said code signal.

5. An apparatus for controlling a data recording medium playback apparatus, comprising:
   a printed code scanner for converting optical changes produced during scanning of a printed code into an electrical code signal;
   decision means for judging operating commands which are expressed by said code signal, said decision means comprising means for detecting a total number of digits in said code signal irrespective of data contents expressed by said digits, and means for generating said operating command based upon both said data contents and upon said total number of digits; and
   control means for issuing operating commands for controlling said data recording medium playback apparatus in accordance with operating commands obtained as a result of said judgment by said decision means;
   in which said printed code scanner includes a manually operated repeat switch, and in which said decision means is responsive to actuation of said repeat switch for maintaining unchanged the contents of an electrical code signal derived from said printed code scanner.

6. A control apparatus according to claim 5, in which said manual repeat switch is a nonlocking switch.

* * * * *